United States Patent [19]

El-Shafei

[11] Patent Number: 5,058,452
[45] Date of Patent: Oct. 22, 1991

[54] HYBRID SQUEEZE FILM DAMPER FOR ACTIVE CONTROL OF ROTORS

[75] Inventor: Aly El-Shafei, Tampa, Fla.

[73] Assignee: University of South Florida, Tampa, Fla.

[21] Appl. No.: 520,474

[22] Filed: May 8, 1990

[51] Int. Cl.$^5$ .............................................. G05G 1/00
[52] U.S. Cl. ..................................... 74/573 F; 74/572
[58] Field of Search ............................. 74/572–573 F

[56] References Cited

U.S. PATENT DOCUMENTS

| | | | |
|---|---|---|---|
| 4,002,086 | 1/1977 | Reinhall | 74/573 F |
| 4,281,563 | 8/1981 | Favrot | 74/573 F |
| 4,295,386 | 10/1981 | Zhivotov | 74/573 F |
| 4,537,177 | 8/1985 | Steere et al. | 74/573 F |
| 4,625,509 | 12/1986 | Sheppard | 74/573 F |
| 4,781,077 | 11/1988 | El-Sahfei | 74/572 X |
| 4,905,419 | 3/1990 | Makarov et al. | 74/573 F X |
| 4,905,807 | 3/1990 | Rohs et al. | 74/573 F |
| 4,928,548 | 5/1990 | Lulay | 74/573 F |

FOREIGN PATENT DOCUMENTS

| | | | |
|---|---|---|---|
| 0266336 | 10/1989 | Japan | 74/573 F |
| 442798 | 1/1968 | Switzerland | 74/573 F |

Primary Examiner—Vinh T. Luong
Attorney, Agent, or Firm—Joseph C. Mason, Jr.; Ronald E. Smith

[57] ABSTRACT

A shaft rotating assembly typically used in gas turbine engines having a hybrid squeeze film damper for active control of rotors. The squeeze film damper includes seal ring means to confine the oil into a defined space. The seal ring means are axially moveable preferably by controller means to provide long damper and short damper protection within the same defined space. The squeeze film damper thus can operate as a long damper near critical speeds and it can also operate as a short damper at operating speeds.

4 Claims, 3 Drawing Sheets

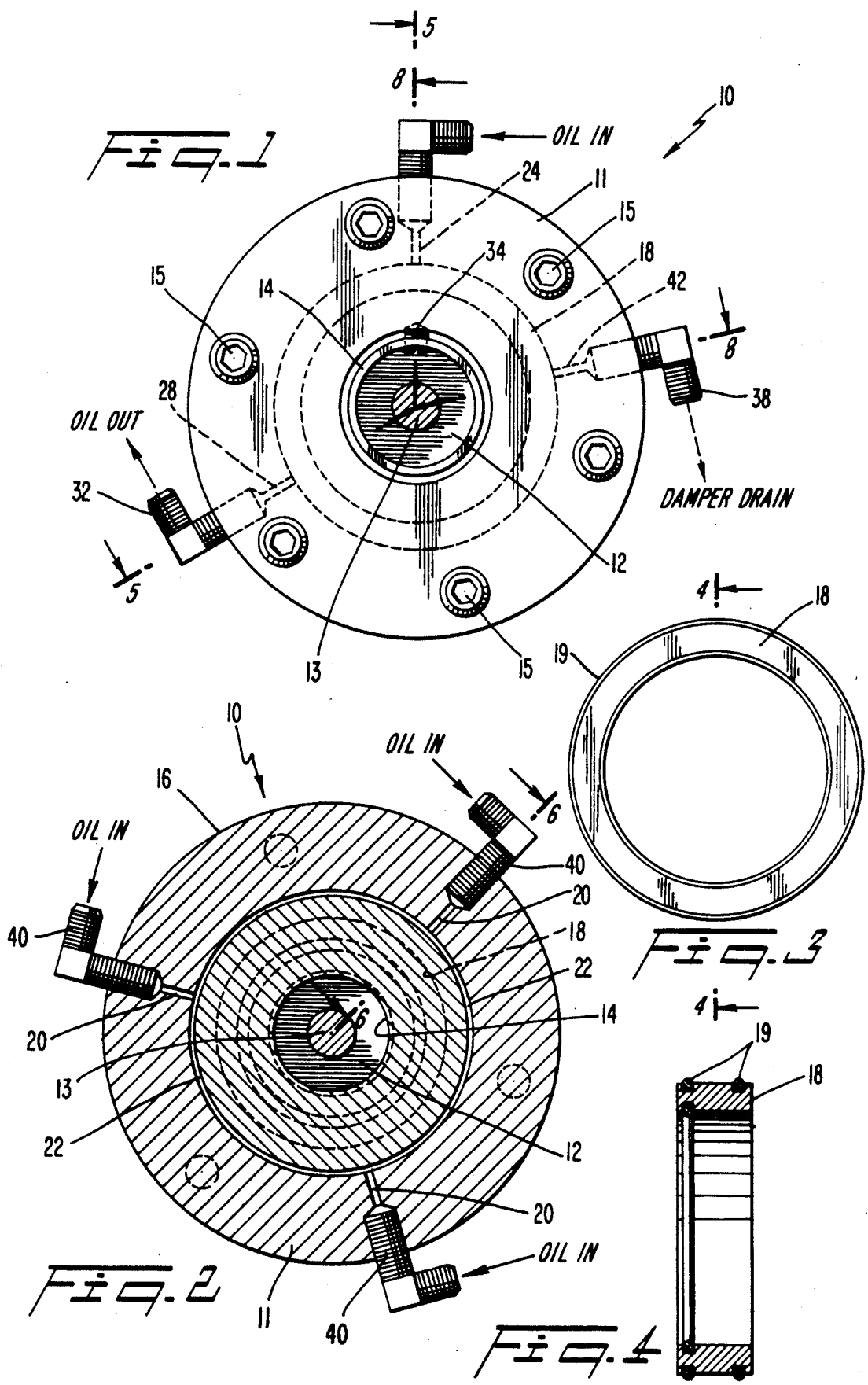

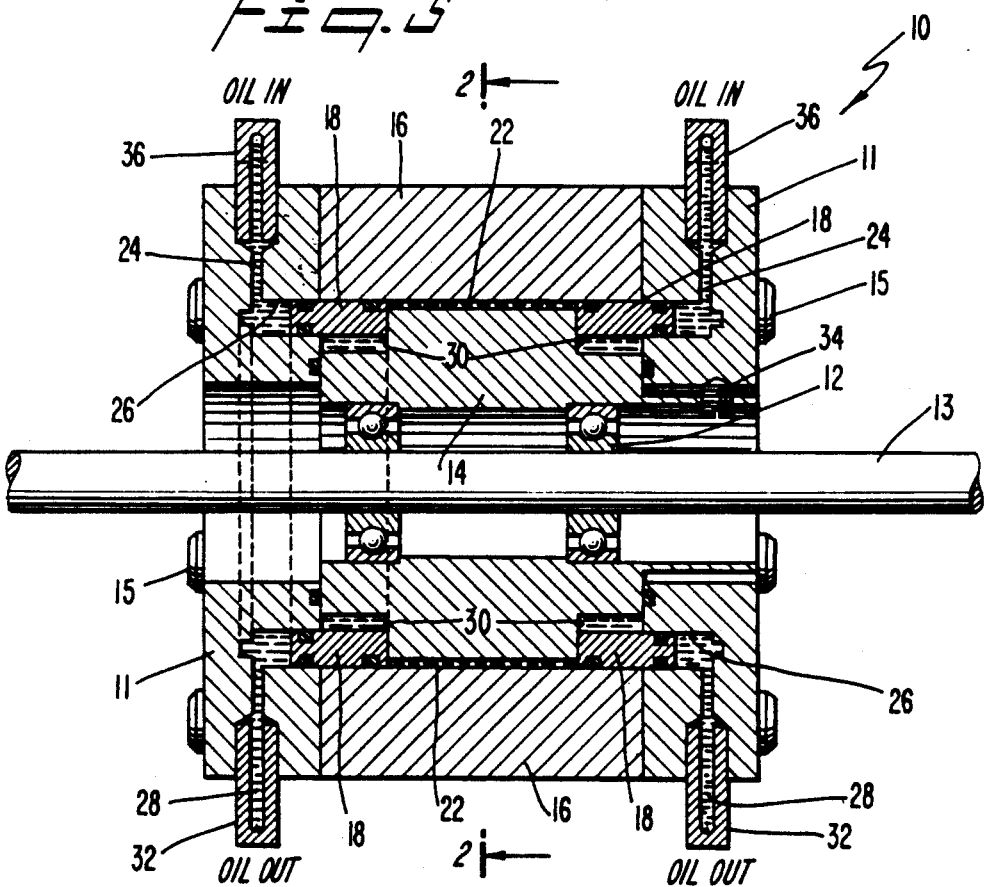
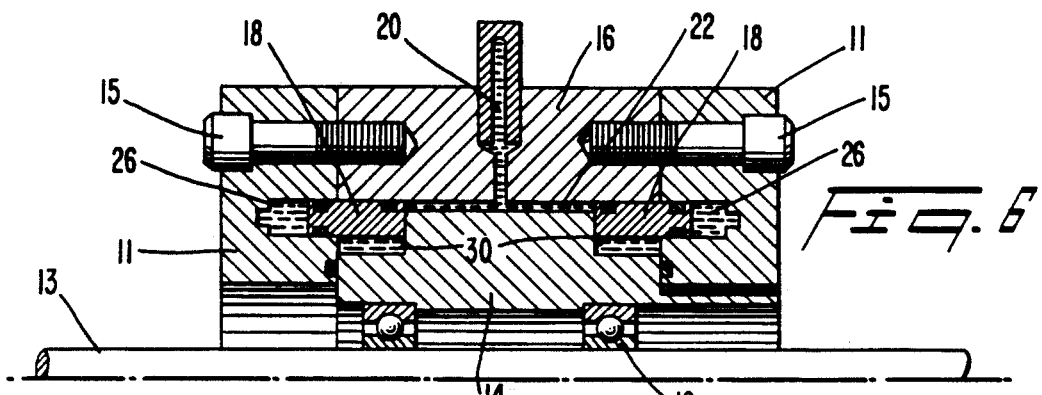
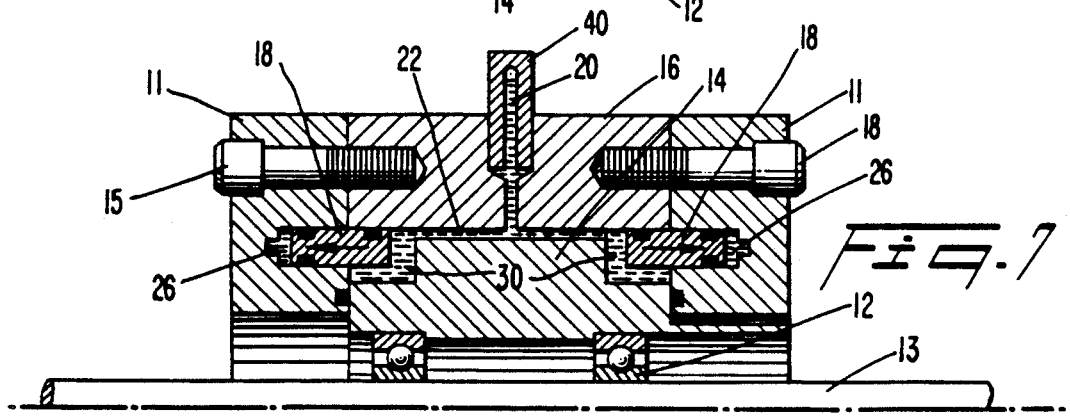

HYBRID SQUEEZE FILM DAMPER FOR ACTIVE CONTROL OF ROTORS

TECHNICAL FIELD

The invention relates to a shaft rotating assembly and more particularly, to a shaft rotating assembly incorporating a device having an adjustable squeeze film damper for attenuating vibration. The shaft rotating assembly is used in aircraft engines, but is not limited to such use.

BACKGROUND ART

Vibration is often a problem in rotating machinery wherein a shaft rotates in a set of bearings. Vibration damping devices including an oil film in an annular space between the outer race of a bearing and the housing have been utilized. When the shaft moves off the bearing axis, the oil film exerts a damping force on the shaft. These damping devices are known as "squeeze film dampers." In practice, squeeze film dampers are damping devices used in gas turbine engines to dampen the whirling vibration of rotors. The ability of squeeze film dampers to attenuate the amplitude of engine vibrations and to decrease the magnitude of the force transmitted to the engine frame makes them an attractive rotor support. Also, the energy removed in the squeeze film dampers enhances the stability of the rotor-bearing system.

Whirl vibration results from a number of different operational phenomenon. For example, synchronous whirl is caused essentially by centrifugal forces acting on a mass-unbalanced shaft. The shaft is generally mass-unbalanced because the geometric and inertial axes of the shaft are not identical due to machining tolerances and material imperfections, wear and tear, and in some instances due to residues on the shaft from the working fluid in a turbomachine. When the synchronous whirl frequency coincides with a natural frequency in the rotor-bearing system, the system's vibration amplitudes can become excessive. The system is then said to be in resonance. The system's natural resonant frequency is generally referred to as its critical speed.

Another operational phenomenon is a self-excited whirl. This occurs when whirl vibration is caused by elements within the rotor-bearing system and may cause the system to become unstable. Such self-induced vibration rapidly increases in amplitude and frequently is catastrophic to the bearing system.

Other causes of shaft instability include aerodynamic induced excitations which may originate from pressure variations around the circumference of impellers and seals and from material hysteresis, rubbing between rotating and stationary parts and other such activity common to rotating equipment.

Another undesirable phenomenon in rotor-bearing systems is the jump resonance phenomenon. The rotor, under certain conditions, will exhibit a jump from a certain whirling orbit to another. Such jump phenomenon has been referred to as "bistable" operation of a rotor incorporating a squeeze film damper and indicates the non-linear behavior of squeeze film dampers.

The damping or fluid inertia forces in squeeze film dampers are predicted by Reynolds number. Traditionally, squeeze film dampers were operating at very low squeeze Reynolds number. As the speed of aircraft engines increased and as the trend of using lighter viscosity oils increased, the values of Reynolds numbers for squeeze film dampers, in practice, has increased dramatically. Thus, the effect of fluid inertia became more pronounced.

For low Reynolds numbers, the pressure in the damper is determined by the solution of the Reynolds equation. Squeeze film dampers generally can be classified into two broad categories: short dampers and long dampers. Short dampers are those dampers for which the short bearing approximation to the Reynolds equation applies. The short bearing approximation is justified if the damper is relatively short in the axial direction such that the flow in the damper is substantially axial rather than substantially circumferential. Accordingly, for short dampers the pressure gradient in the axial direction is larger than the pressure gradient in the circumferential direction. The aircraft industry has developed a number of effective short damper designs. Long dampers are those dampers for which the long bearing approximation to the Reynolds equation applies. The long bearing approximation is justified if the damper is relatively long in the axial direction such that the flow in the damper is substantially circumferential rather than substantially axial. Therefore, for long dampers, the pressure gradient in the circumferential direction is larger than in the axial direction. For tightly sealed dampers, the flow of the working fluid in the damper is circumferential rather than axial even if the damper is physically short. In such case, the damper behaves as a long damper.

In practice, short dampers are effective at attenuating the magnitude of the vibratory force transmitted to the engine frame at the operating speed. Long dampers are effective at attenuating the amplitude of vibration of the engine at the critical speed. Heretofore, long damper characteristics and short damper characteristics have not been present at the same time in a squeeze film damper. Moreover, no long damper has ever met with commercial success, because no one has been able to design an effective sealing means for long dampers.

It would be advantageous to have a device for dampening vibration which incorporates the benefits of short dampers and long dampers.

Long dampers have less tendency to exhibit the jump resonance phenomenon, which phenomenon can seriously damage an engine. Long dampers are also capable of sustaining high loads which allows rotors to operate for relatively short periods of time with extremely high levels of unbalance such as with a blade loss during operation. Further, long dampers have better stability characteristics then short dampers, i.e., are more capable of removing energy from the vibrations, and thus tend to stabilize the rotor.

However, long dampers transmit larger forces to the support and are susceptible to the effects of fluid inertia, which can introduce additional critical speeds in the frequency range of interest.

On the other hand, short dampers transmit a smaller force to the support, and, thus, are better vibration isolators and are less susceptible to the effects of fluid inertia.

Thus, if a squeeze film damper could be designed to operate as a short damper when it is desired to have a relatively small force transmitted to the support and to operate as a long damper when a small amplitude of vibration is desired, the squeeze film damper would be more efficient, e.g., rotors could operate safely at higher speeds. However, the prior art, considered as a whole, neither teaches nor suggests how this desirable end could be achieved.

DISCLOSURE OF INVENTION

Accordingly, an object of this invention is to provide an improved shaft rotating assembly.

A further object of this invention is to provide an improved device to control rotor vibration.

A still further object of this invention is to provide an improved squeeze film damper for active control of rotor vibration.

A specific object of this invention is to provide an improved device for controlling vibration that attenuates the amplitude of vibration at critical speeds.

A further specific object of this invention is to provide an improved device for controlling vibration that reduces the forces transmitted to the support at operating speeds.

A still further object of this invention is to provide an improved device for controlling vibration that eliminates the jump resonance phenomenon.

Another further object of this invention is to provide an improved device for controlling vibration that permits the rotor to operate at high loads for relatively short periods of time.

Another still further object of this invention is to provide an improved device for controlling vibration that reduces fluid inertia effects and provides better starting characteristics.

A unique object of this invention is to provide a static long damper within the area of a short damper configuration.

According to the present invention, these and other features and objects are achieved with a device for controlling rotor vibration, comprising:
 a rotatably mounted shaft;
 a housing for said shaft;
 means for supporting the shaft from the housing while permitting the shaft to rotate;
 squeeze film damper means defining an annular cavity between the housing and the means for supporting the shaft;
 slidably mounted seal ring means being concentrically disposed with respect to said shaft and being disposed at opposite ends of the annular cavity for cooperating with adjacent surfaces of the housing and the means for supporting the shaft;
 a defined space at opposite ends of the annular cavity within which the seal ring means are free to move in opposite axial directions;
 means for filling the annular cavity with fluid; and
 means for selectively axially displacing the seal ring means within the defined space into and out of sealing relation to the annular cavity.

In its preferred embodiment, the device further comprises a first conduit in the housing, the first conduit being confluent with the annular cavity, a second conduit confluent with the defined space, and the seal ring means are positioned intermediate an associated end of the annular cavity and the second conduit so that the seal ring means is axially displaced in a first direction when fluid is introduced into the annular cavity and fluid is introduced into the defined space such that the first pressure is higher than the second pressure and is axially displaced in a second direction opposite to the first direction when fluid is introduced into the annular cavity and fluid is introduced into the defined space such that the first pressure is lower than the second pressure.

More specific embodiments include hydraulic, electrical, magnetic, and mechanical means for axially displacing the seal ring means.

By maintaining proper adjustment, using controller means, of the pressure within a defined space and the force being exerted against a seal ring, the squeeze film damper can be made to be tightly sealed, i.e., a long damper, or open ended, i.e., a short damper, almost instantaneously. In the practice of this invention, by exerting a relatively larger force against the outer surface of the seal ring, the damper becomes virtually sealed with no or very small pressure gradient along the axis but with substantial pressure gradient circumferentially, i.e., a long damper. Under reset conditions sensed by the controller, the force against the outer surface of the seal ring is released, and the fluid pressure in the defined space will push the seal rings out with significant axial flow of fluid within the defined space, i.e., a short damper. In both configurations of this invention, the damping surface area remains the same. Thus, according to this invention, if the squeeze film damper is relatively tightly sealed, the flow is circumferential even if the damping area is short, whereby the damper will have the characteristics of a long damper.

The invention accordingly comprises the features of construction, combination of elements and arrangement of parts that will be exemplified in the construction set forth hereinafter and the scope of the invention will be indicated in the claims.

DESCRIPTION OF DRAWINGS

For a fuller understanding of the nature and objects of the invention, reference should be made to the following detailed description, taken in connection with the accompanying drawings, in which:

FIG. 1 is an end view of the damping device in accordance with the present invention.

FIG. 2 is a partial sectional view of the device taken along line 2—2 in FIG. 5.

FIG. 3 is an end view of a sealing ring of the present invention.

FIG. 4 is a sectional view of a sealing ring taken along line 4—4 of FIG. 3.

FIG. 5 is a sectional view of the rotor system in accordance with the present invention taken along line 5—5 in FIG. 1 illustrating the closed position of the damper device acting as a long damper.

FIG. 6 is a further sectional view of the system taken along line 6—6 in FIG. 2 illustrating the closed position of the damper device acting as a long damper in accordance with the present invention.

FIG. 7 is a further sectional view of the system taken along line 6—6 in FIG. 2 illustrating the open position of the damper device acting as a short damper in accordance with the present invention.

BEST MODES FOR CARRYING OUT THE INVENTION

Figure 8:
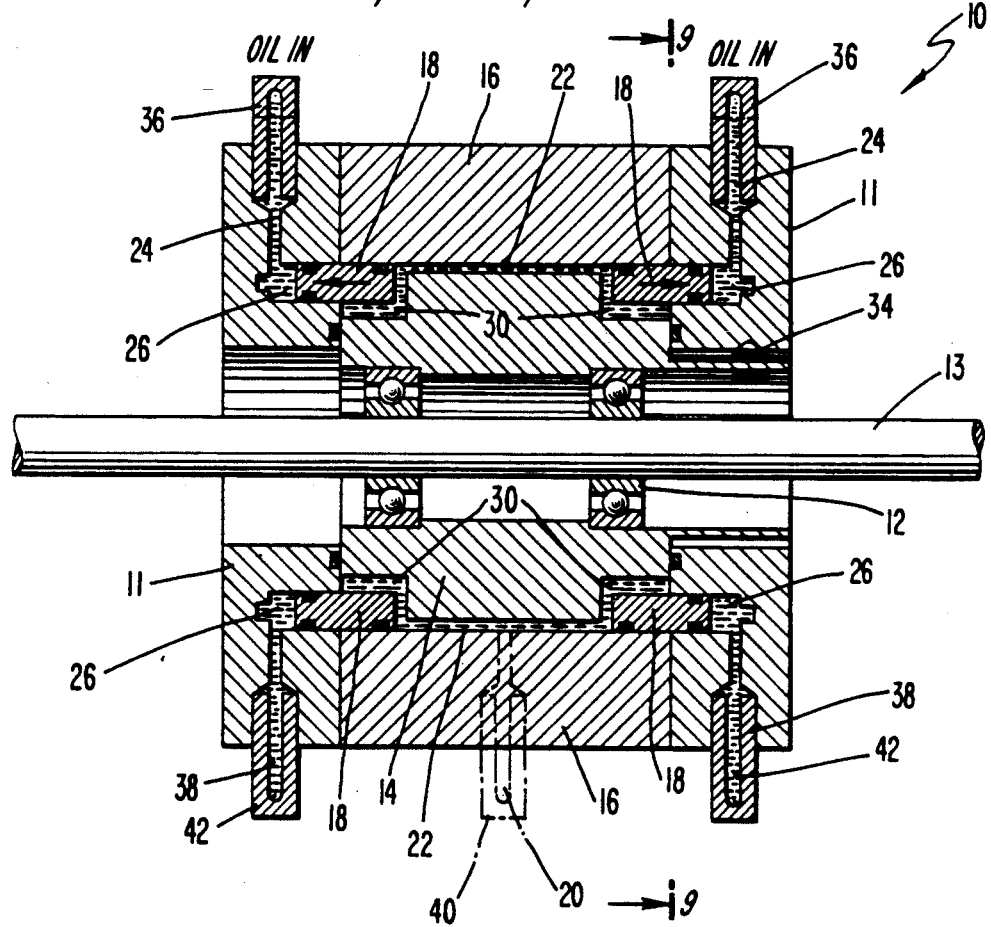
FIG. 8 is a sectional view of the rotor system in accordance with the present invention taken along line 8—8 in FIG. 1 illustrating the open position of the damper device acting as a short damper.

Referring now to FIG. 1, it will there be seen that an exemplary embodiment of the invention is denoted as a whole by the reference numeral 10.

Assembly 10 includes a rotary shaft 13 with reference to which all other parts of said assembly are concentrically disposed, radially outwardly of said shaft 13.

As best understood in connection with FIGS. 5–8, assembly 10 includes a pair of longitudinally spaced end caps 11 which are bolted to stationary housing 16 of tubular construction, at opposite ends thereof, by a plurality of circumferentially spaced bolts, collectively denoted 15. As those FIGS. also make clear, an annular, centrally apertured stationary bearing support 14 axially receives shaft 13, and bearing means 12 permit rotation of shaft 13. Note pin 34 (FIG. 5) that interlocks bearing support 14 to an end cap 11 to prohibit sympathetic rotation of bearing support 14. Note also that the flat opposite outer end walls of the bearing support 14 abut the inboard walls of end caps 11 and that an annular seal is provided to prevent leakage of liquid or gaseous fluid between said end cap inboard walls and said opposite outer end walls of said bearing support 14. Note also that an annular cavity 22 of small radial extent is defined radially outwardly of the bearing support 14, and that said cavity is filled with a preselected liquid or gaseous fluid.

As is also clear from all of the FIGS., an annular groove 26 is formed in the inboard walls of both end caps 11, and the annular sealing rings 18 of FIGS. 3 and 4 are at least partially slidably disposed within their associated annular grooves 26, i.e., the respective outboard ends of said sealing rings 18 are slidably received within said grooves 26. As shown in FIGS. 5 and 6, when said sealing rings 18 are slidably disposed toward one another, i.e., when they are at their respective innermost positions, their outboard ends remain at least partially within grooves 26 and their respective inboard ends abut flat inner end walls 30 of bearing support 14. When so positioned, they seal annular cavity 22 so that the preselected fluid within said cavity 22 is sealed therewithin. Thus, substantial axial flow of said fluid is prevented; this is the long damper position of device 10.

Fluid is introduced into each annular groove 26 through conduit 24 formed in inlet port 36, and is drained from each groove through conduit 28 formed in outlet port 32. Fluid is drained from annular cavity 22 through conduit 42 formed in drainage port 38. Note from FIG. 8 that drainage ports 38 are open when sealing rings 18 are in their short damper configuration.

Fluid is introduced into annular cavity 22 by a plurality of circumferentially spaced damper ports 40 each of which has a conduit means 20 formed therein.

In summary, there are two inlet ports 36, i.e., one in each end cap 11, for introducing the preselected fluid into annular grooves 26, two outlet ports 32, one in each end cap, for draining said annular grooves, three ports 40 formed in housing 16, mid-length thereof, for introducing said fluid into annular cavity 22, and two ports 38, one in each end cap 11, for draining said fluid from said annular cavity. In other words, there are a total of nine ports: three inlet ports 40 in the housing 16 for introducing fluid into annular cavity 22, and three ports in each end cap, one for introducing fluid into groove 26, one for discharging fluid from groove 26, and one for draining annular cavity 22. Of course, the number of ports is not critical, as pointed out in the claims that follow.

Figure 9:
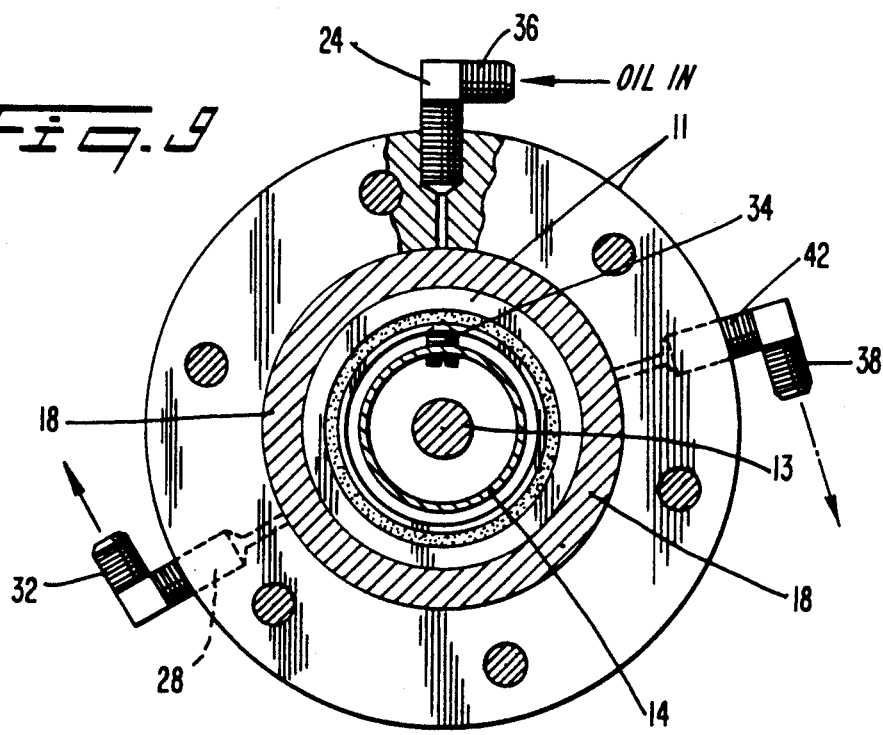
FIG. 9 is a partial sectional view of the device in accordance with the present invention taken along line 9—9 in FIG. 8

The ports are circumferentially spaced from one another as depicted in FIGS. 1, 2, and 9 and as may be ascertained from FIGS. 5–8.

It should not be clear that sealing rings 18 will assume their closed positions as depicted in FIGS. 5 and 6 when the pressured of the fluid in annular grooves 26 exceeds the pressure of the fluid in annular cavity 22, and that said rings will assume their open, i.e., outermost positions as shown in FIGS. 7 and 8 when the pressure of the fluid in annular cavity 22 exceeds that of the fluid in the annular grooves 26. It should be equally clear that suitable control means are provided to supply and drain the fluid through the appropriate ports as needed to accomplish the desired positions of the sealing rings 18 depending upon the application of the system 10. The system 10 operates as a long damper when in the configuration of FIGS. 5 and 6, and as a short damper when configured as depicted in FIGS. 7 and 8.

All of the ports are opened, closed, or throttled as required to position sealing rings 18 in whatever configuration thereof is required for a specific application.

Moreover, although the preferred embodiment contemplates the provision of slidably mounted sealing rings 18, the structure shown herein is easily modified to delete the adjustability of said rings 18. An end user having no requirement for a short damper may supply high pressure fluid through ports 36, thereby securing rings 18 into their FIG. 5 position. Those skilled in this art will appreciate that this novel contribution solves the longstanding sealing problem that has plagued the long damper designs of the prior art.

This invention is clearly new and useful. Moreover, it was not obvious to those of ordinary skill in this art at the time it was made, in view of the prior art considered as a whole in accordance with the requirements of law.

It will thus be seen that the objects set forth above, and those made apparent from the foregoing description, are efficiently attained and since certain changes can be made in the above description without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for controlling rotor vibration, comprising:
    a rotatably mounted shaft;
    a stationary housing of tubular construction that axially receives said shaft;
    a bearing support member positioned within said hollow housing in radially outward relation to said shaft and in radially inward relation to said housing;
    said housing and said bearing support member being concentrically disposed with respect to said shaft;
    an annular cavity formed between said bearing support member and said housing;
    a pair of centrally apertured end caps fixedly secured to opposite ends of said housing, said end caps receiving said shaft;
    an annular groove formed in each of said end caps;

an annular sealing ring slidably disposed in each of said annular grooves between an outermost position and an innermost position;

each of said sealing rings adapted to sealingly abut opposite walls of said bearing support member when said sealing rings are in said innermost position;

said sealing rings being disposed in sealing relation to said annular cavity when disposed in said innermost position and in open relation thereto when disposed in said outermost position;

means for selectively introducing fluid into each of said annular grooves;

means for selectively draining fluid from each of said annular grooves;

means for selectively introducing fluid into said annular cavity; and means for selectively draining fluid from said annular cavity;

whereby movement of said sealing rings into and out of sealing relation to said annular cavity is effected by controlling fluid pressures on opposite sides of said sealing rings; and whereby said device operates as a long damper when said sealing rings are in said innermost position and as a short damper when in said outermost position.

2. The device of claim 1 wherein outboard ends of said sealing rings remain within their associated annular grooves when said annular rings are in their innermost position and in their outermost position.

3. The device of claim 2, wherein opposite end walls of said bearing support member abuttingly engage inboard walls of their associated end caps and further comprising a pin that interlocks said bearing support member and a preselected end cap to prevent sympathetic rotation of said bearing support member about said rotary shaft.

4. A device for controlling rotor vibration, comprising:

a rotatably mounted shaft;

a stationary housing of tubular construction that axially receives said shaft;

a bearing support member positioned within said hollow housing in radially outward relation to said shaft and in radially inward relation to said housing;

said housing and said bearing support member being concentrically disposed with respect to said shaft;

an annular cavity formed between said bearing support member and said housing;

a pair of centrally apertured end caps fixedly secured to opposite ends of said housing, said end caps receiving said shaft;

an annular groove formed in each of said end caps;

a pair of annular sealing rings, each ring of said pair of rings having an outboard end disposed in an associated annular groove;

each of said sealing rings having an inboard end adapted to sealingly abut opposite walls of said bearing support member;

sealing rings being disposed in sealing relation to said annular cavity when abutting opposite walls of said bearing support member;

means for selectively introducing fluid into each of said annular grooves;

means for selectively draining fluid from each of said annular grooves;

means for selectively introducing fluid into said annular cavity;

means for selectively draining fluid from said annular cavity; and said sealing rings being disposed in sealing relation to said annular cavity when fluid is introduced into said annular grooves at a pressure greater than the pressure of fluid in said annular cavity;

whereby said device operates as a long damper when said sealing rings are disposed in said sealing relation.

* * * * *